(12) United States Patent
Radadia et al.

(10) Patent No.: US 10,269,353 B2
(45) Date of Patent: Apr. 23, 2019

(54) SYSTEM AND METHOD FOR TRANSCRIPTION OF SPOKEN WORDS USING MULTILINGUAL MISMATCHED CROWD UNFAMILIAR WITH A SPOKEN LANGUAGE

(71) Applicant: Tata Consultancy Services Limited, Mumbai (IN)

(72) Inventors: Purushotam Gopaldas Radadia, Pune (IN); Kanika Kalra, Pune (IN); Rahul Kumar, Pune (IN); Anand Sriraman, Pune (IN); Gangadhara Reddy Sirigireddy, Pune (IN); Shrikant Joshi, Pune (IN); Shirish Subhash Karande, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 56 days.

(21) Appl. No.: 15/476,505

(22) Filed: Mar. 31, 2017

(65) Prior Publication Data
US 2018/0061417 A1 Mar. 1, 2018

(30) Foreign Application Priority Data
Aug. 30, 2016 (IN) .............................. 201621029485

(51) Int. Cl.
*G10L 15/06* (2013.01)
*G06F 17/28* (2006.01)
(Continued)

(52) U.S. Cl.
CPC ............ *G10L 15/26* (2013.01); *G06F 3/0238* (2013.01); *G06F 17/2836* (2013.01);
(Continued)

(58) Field of Classification Search
CPC ... G10L 15/063; G10L 25/90; G06F 17/2836; G06F 3/0238; G06F 17/3043
See application file for complete search history.

(56) References Cited

U.S. PATENT DOCUMENTS

| | | | |
|---|---|---|---|
| 6,535,849 B1 * | 3/2003 | Pakhomov | G10L 15/063 704/235 |
| 7,212,968 B1 * | 5/2007 | Garner | G06F 17/3043 704/231 |

(Continued)

*Primary Examiner* — Farzad Kazeminezhad
(74) *Attorney, Agent, or Firm* — Finnegan, Henderson, Farabow, Garrett & Dunner LLP (57) ABSTRACT

The disclosure generally relates to transcription of spoken words, and more particularly to a system and method for transcription of spoken words using multilingual mismatched words. The process comprises collection of multi-scripted noisy transcriptions of the spoken word obtained from workers of the multilingual mismatched crowd unfamiliar with the spoken language. The collected words are mapped to a phoneme sequence in the source language using script specific graphemes to phoneme model. Further, it builds a multi-scripted transcription script specific, worker specific and a global insertion-deletion-substitution (IDS) channel. Furthermore, the disclosure also determines reputation of workers to allocate the transcription task. Determination of reputation is based on word belief. The word belief is determined by taking ratio of likelihood probability of mapped phoneme sequence of transcriptions given the current estimate of word to the sum of likelihood probabilities of mapped phoneme sequences of the transcriptions given the phoneme sequence of each dictionary word.

15 Claims, 5 Drawing Sheets

Applicant: Tata Consultancy Services Limited

200

(51) Int. Cl.
    *G10L 25/90*      (2013.01)
    *G06F 17/30*      (2006.01)
    *G06F 3/023*      (2006.01)
    *G10L 15/26*      (2006.01)
    *G10L 15/00*      (2013.01)
(52) U.S. Cl.
    CPC ........ *G06F 17/3048* (2013.01); *G10L 15/005* (2013.01); *G10L 15/063* (2013.01); *G10L 25/90* (2013.01)

(56) References Cited

U.S. PATENT DOCUMENTS

| | | |
|---|---|---|
| 8,438,005 B1 | 5/2013 | Gupta et al. |
| 2007/0294076 A1* | 12/2007 | Shore ................. G06F 17/2836 704/2 |
| 2008/0221866 A1 | 9/2008 | Katragadda et al. |
| 2011/0099000 A1 | 4/2011 | Rai et al. |
| 2013/0262096 A1* | 10/2013 | Wilhelms-Tricarico .................... G10L 25/90 704/202 |
| 2014/0111438 A1* | 4/2014 | Savage ................. G06F 3/0238 345/168 |
| 2014/0278350 A1 | 9/2014 | Scriffignano et al. |

\* cited by examiner

SYSTEM AND METHOD FOR TRANSCRIPTION OF SPOKEN WORDS USING MULTILINGUAL MISMATCHED CROWD UNFAMILIAR WITH A SPOKEN LANGUAGE

PRIORITY CLAIM

This U.S. patent application claims priority under 35 U.S.C. § 119 to: India Application No. 201621029485, filed on Aug. 30, 2016. The entire contents of the aforementioned application are incorporated herein by reference.

TECHNICAL FIELD

The embodiments herein generally relates to transcribing spoken words and, more particularly, to a system and method for transcription of spoken words using multilingual mismatched words.

BACKGROUND

In this digital age, mobile phone accessibility has reached to almost everyone in world. This advancement can be used to derive a demographic advantage for crowd work. But there are various scripts and languages in the world for reading and writing.

Speech transcription is simply a process of writing down the spoken words in the script of language being spoken based on what we hear. Generally speech transcription has relied on the crowd workers being native speakers of the source language. Recently, the mismatched crowd unfamiliar with the spoken language has been used to transcribe the speech in Roman script. The inventors here have recognized several technical problems with such conventional systems, as explained below. Such crowdsourcing again assumes that crowd worker has to be familiar with the Roman script. This scenarios can clearly limit the addressable crowd size. Thus it is important to explore the utility of a highly mismatched crowd which is not only unfamiliar to spoken language but also knows only their native script which may not be the Roman script. In this invention, we utilize such highly mismatched multilingual crowd for speech transcription. Sometimes, if there is a highly mismatched crowd to be used for speech transcription, an intermediate process of transliteration takes place. Such intermediate transliteration step may use English as pivot script from which the transcription in original script is decoded. Since the simple transliteration process cannot account for the errors made by the transcriber. The system model these errors with a phoneme level insertion-deletion-substitution channel model. In other words, the multi-scripted crowd responses can be transliterated into English (Roman) script first and then phoneme sequences are obtained using English grapheme to Source language's phoneme sequence models. The maximum likely phoneme sequence is used to model the insertion deletion and substitution errors made by worker. These channels are used to decode a word in source script using maximum-likely combination of crowd work. The overall system consists of pre-filtering unit that utilizes adaptive tests for removing workers who are of extremely poor quality, and also an allocation strategy that allocates a word to users in an optimized manner until sufficient confidence in the word transcription is built. The intermediate transliteration step helps achieve the phonetic sequences in source language using grapheme to phoneme modelling. In another embodiment, one can also directly model the phoneme sequences from worker's script without using any pivot script.

SUMMARY

Embodiments of the present disclosure present technological improvements as solutions to one or more of the above-mentioned technical problems recognized by the inventors in conventional systems. For example, in one embodiment, a system for transcribing one or more spoken word utterances of a source language using a multilingual mismatched crowd is provided. The system comprises a processor, a memory communicatively coupled to the processor and the memory contains instructions that are readable by the processor, a database communicatively coupled to the memory, wherein the database comprises an audio chunk table and a word transcription table, a plurality of typing interfaces are configured according to script preference of each one or more workers of mismatched crowd, a reputation module is configured to compute the worker reputation and filter out the spammer from the plurality of workers, a task allocation module is configured to compute word beliefs and to allocate the transcription tasks to the plurality of the mismatched crowd workers in optimal fashion, wherein the reputation of the plurality of workers is estimated by simulating the worker specific IDS channel on dictionary words, and a transcription decoding module is configured to generate transcription in the source language from multi-transcriptions of the each of the plurality of workers.

In another embodiment, a method for transcribing one or more spoken word utterances of a source language using a multilingual mismatched crowd is provided. The method comprises collecting, at word transcription table, a plurality of multi-scripted noisy transcriptions of the spoken word obtained from plurality of workers of the multilingual mismatched crowd, mapping each of the collected plurality of multi-scripted transcriptions to a phoneme sequence in the source language using script specific graphemes to phoneme model, building worker specific insertion-deletion-substitution (IDS) channel model, multi-scripted transcription script specific IDS channel model and a global IDS channel model from the multi-scripted transcriptions, filtering out a set of workers of the plurality of workers based on the reputation of the workers, estimated by simulating IDS channel for worker specific on the dictionary words using worker reputation module, allocating the transcription tasks to the set of workers such that the required number of transcriptions per word are minimized; and decoding, at a transcription decoding module, the plurality of multi-scripted transcriptions are combined to decode the transcription in source script. The decoding of multi-scripted transcription further comprising finding the likelihood probability of the mapped phoneme sequences of the multi-lingual mismatched crowd transcriptions with each of the predefined dictionary word's phoneme sequence using insertion-deletion-substitution channel parameters and voting the dictionary word that maximizes above likelihood and determining word belief by taking ratio of likelihood probability of mapped phoneme sequences of transcriptions given the current estimate of word to the sum of likelihood probabilities of mapped phoneme sequences of the transcriptions given the phoneme sequence of each dictionary word.

In yet another embodiment, a non-transitory computer readable medium embodying a program executable in a computing device for transcribing one or more spoken word utterances of a source language using a multilingual mismatched crowd is provided is disclosed. The one or more instructions which when executed by one or more hardware processors causes collecting, at word transcription table, a plurality of multi-scripted noisy transcriptions of the spoken word obtained from plurality of workers of the multilingual mismatched crowd, mapping each of the collected plurality of multi-scripted transcriptions to a phoneme sequence in the source language using script specific graphemes to phoneme model, building worker specific insertion-deletion-substitution (IDS) channel model, multi-scripted transcription script specific IDS channel model and a global IDS channel model from the multi-scripted transcriptions, filtering out a set of workers of the plurality of workers based on the reputation of the workers, estimated by simulating IDS channel for worker specific on the dictionary words using worker reputation module, allocating the transcription tasks to the set of workers such that the required number of transcriptions per word are minimized; and decoding, at a transcription decoding module, the plurality of multi-scripted transcriptions are combined to decode the transcription in source script. The decoding of multi-scripted transcription further comprising finding the likelihood probability of the mapped phoneme sequences of the multilingual mismatched crowd transcriptions with each of the predefined dictionary word's phoneme sequence using insertion-deletion-substitution channel parameters and voting the dictionary word that maximizes above likelihood and determining word belief by taking ratio of likelihood probability of mapped phoneme sequences of transcriptions given the current estimate of word to the sum of likelihood probabilities of mapped phoneme sequences of the transcriptions given the phoneme sequence of each dictionary word.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
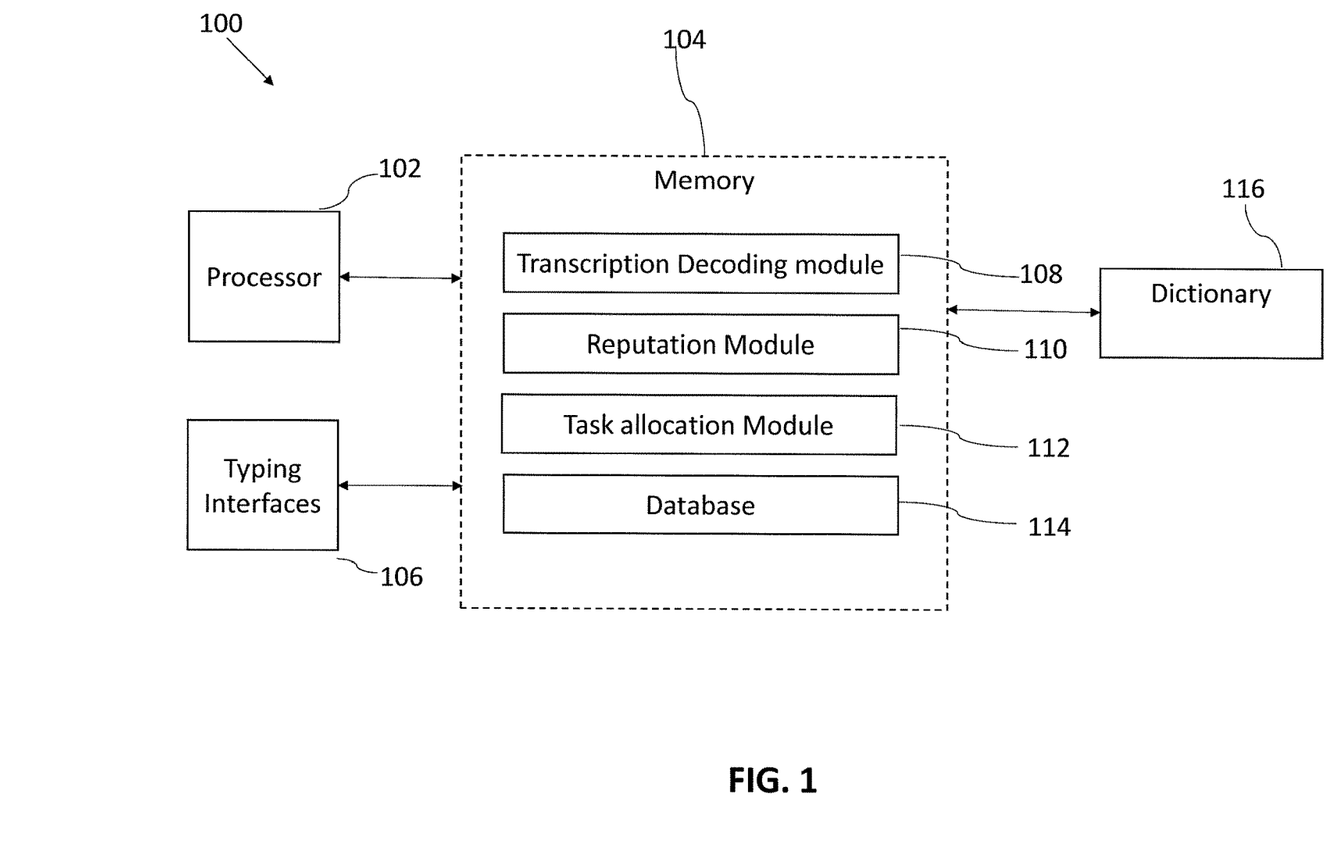
FIG. 1 illustrates a system for transcribing one or more spoken word utterances of a source language using a multilingual mismatched crowd, according to some embodiments of the present disclosure.

Referring FIG. 1, a system 100 for transcribing one or more spoken word utterances of a source language using a multilingual mismatched crowd. The system 100 comprising a processor 102, a memory 104 communicatively coupled to the processor 102, a plurality of typing interfaces 106, a transcription decoding module 108, a reputation module 110 and a task allocation module 112.

In the preferred embodiment, the memory 104 contains instructions that are readable by the processor 102 and the database 114 which includes an audio chunk table and a word transcription table. The plurality of typing interfaces 106 which are configured according to script preference of each worker of the multilingual mismatched crowd. The mismatched crowd includes a plurality of workers who are unfamiliar with the source language that is being spoken. The script of the plurality of workers can be different from each other even for the same source language word.

In the preferred embodiment, the transcription decoding module 108 is configured to generate transcriptions in the source language from multi-transcriptions of the plurality of workers. The transcription decoding module 108 maps the multi-transcriptions to the phoneme sequence of the source language using script specific grapheme to phoneme (G2P) models. Further, the transcription decoding module 108 computes the likelihood by aligning dictionary phoneme sequence and workers phoneme sequences obtained from the G2P model. The G2P model are used to create the probabilistic mapping between the characters of input strings and phoneme. In this disclosure the input strings are multi-script-transcriptions of the plurality of workers and phonemes are from source script.

In the preferred embodiment, in training of G2P models, the set of transcriptions and their ground truth phonetic decompositions are applied as an input and mapping are learned using Expectation Maximization Algorithms. The mapping involves, a single/multiple letters (graphemes) to single/multiple phoneme probabilistic mapping. The mapping probabilities are estimated using Expectation Maximization algorithms. Once the G2P model is trained, it can be used to generate the phonetic sequence given the input transcription string.

Figure 2:
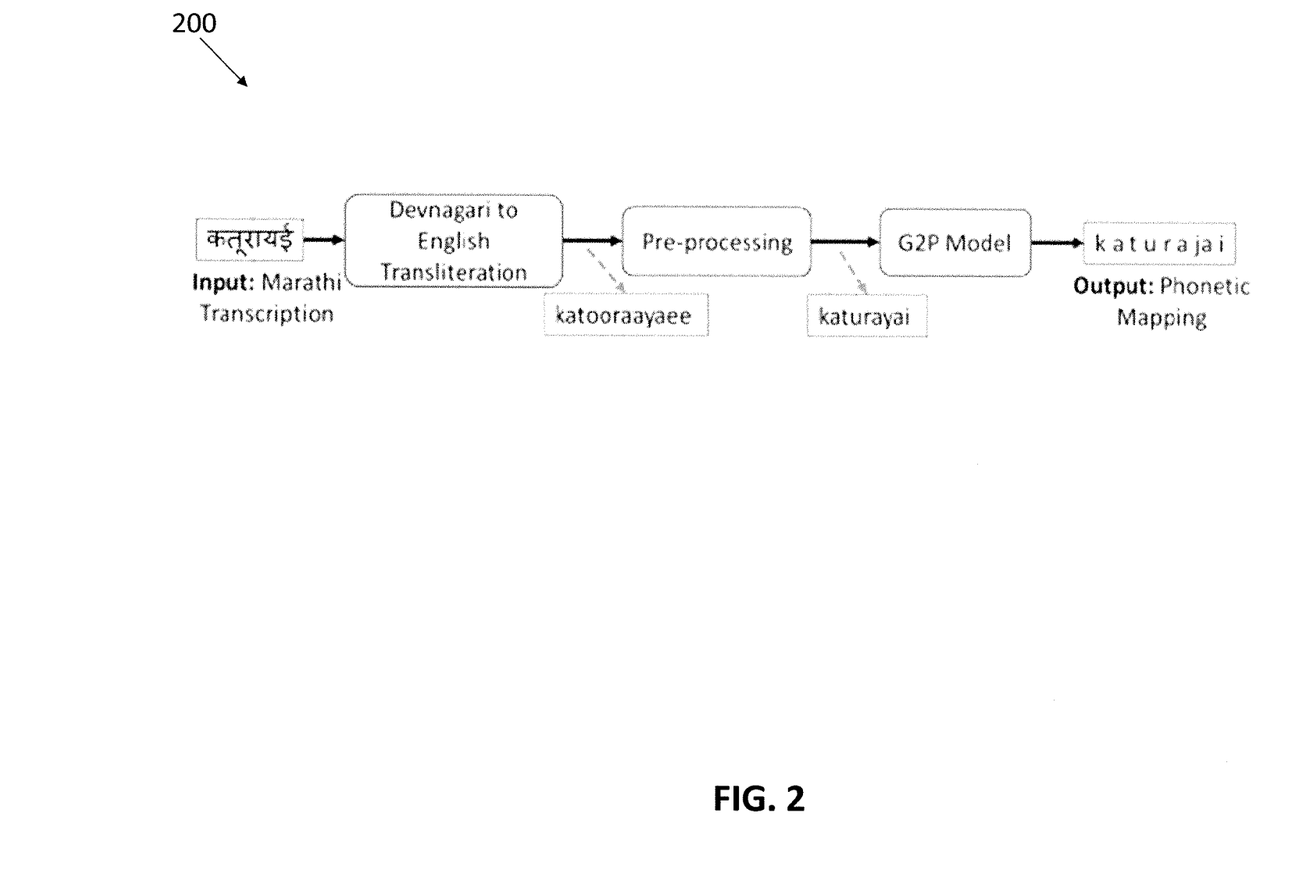
FIG. 2 illustrates an example for phonetic mapping with their corresponding script, according to some embodiments of the present disclosure.

In an example as shown in FIG. 2, the G2P model is trained with the phonetic mapping between Marathi transliterated English scripts to the Russian phonemes. However, the system 100 is eligible to map the source strings to source phone set directly without transliterating the source script string into an intermediate script as English in the given example.

In the preferred embodiment, the G2P models are used to generate the most likely phonetic sequence from the worker's transcription. Once, the phonetic sequences are obtained for all transcriptions, the system 100 trains the insertion deletion and substitution (IDS) channels using them. The IDS channels are trained by using the ground truth phoneme sequences and phoneme sequences obtained from the transcriptions. The approximation of expectation maximization algorithm is used to estimate the IDS channel parameters.

The parameters of IDS channel are as follows: Let be the set of phonemes in the source language (Russian Arpabets). The channel is then described as $p(y|x)=\Lambda \cup \{s\} \to \Lambda^*$ where $\Lambda$ is a set of phonemes in the source script, the channel input x can be any phoneme or a special start symbol s. The output is a string of phonemes. The empty string, $y=\{\ \}$, represents the deletion of a channel input. Let $q_d(a)$ be the probability of phoneme a being deleted. If $y\neq\{\ \}$ then the first symbol in the string corresponds to the input symbol. This symbol is susceptible to a substitution error. Let $q_s(a,b)$ be the probability of phoneme a being substituted by phoneme b. When $y\neq\{\ \}$ the symbols other than the first symbols represent the insertions. The number of insertions is governed by a geometric random variable (r.v) dependent on the input symbol. Let g(a) be the parameter for the geometric r.v. for the input symbol. The inserted symbols can take any phoneme value with equal likelihood. Finally, note that while the system 100 allows for insertions after the start, the system 100 enforces that the start symbol has zero deletion and substitution probability.

In addition to this, the transcription decoding module 108 is configured to compute likelihood probability of a mapped phoneme sequence of a worker's transcription of a spoken word given a phoneme sequence of dictionary word. It is obtained by aligning both phoneme sequences using IDS channel parameters. The likelihood probabilities of each mapped phoneme sequences of multi-scripted transcriptions of a word with a given dictionary word's phoneme sequence are obtained and multiplied so as to obtain the likelihood probability and a dictionary word providing maximum likelihood probability is voted as the transcription of a spoken word. Formally, Let $\overline{X}=[X_0, X_1, \ldots, X_m]$ represent a string of phonemes corresponding to a valid Russian word, that is ground truth sequence, which can be the channel input, meanwhile, let $\overline{Y}=[Y_0, Y_1, \ldots, Y_n]$ be the phoneme sequence corresponding to a transcription which represent the channel output. The system 100 enforce that $X_0=Y_0=\{s\}$. Since the system 100 assumes uniform priors, the decoding for a given transcription is given by:

$$\hat{X} = \underset{X \in V}{\operatorname{argmax}} \, p(\overline{Y}|\overline{X})$$

where V represents the all word dictionary. In addition to that, if the system 100 has multiple phoneme sequences obtained from n multi-scripted transcriptions, $\{\overline{Y}^1, \ldots, \overline{Y}^n\}$ then the decoding rule is given by:

$$\hat{X} = \underset{X \in V}{\operatorname{argmax}} \, p(\overline{Y}^1, \ldots, \overline{Y}^n | \overline{X}) = \prod_{i=1}^{n} p(\overline{Y}^i|\overline{X}).$$

In the preferred embodiment, the IDS channel parameters are used to find $p(\overline{Y}|\overline{X})$ in dynamic programming setting as follows: $f_{(\overline{X},\overline{Y})}(i,j)=-\log(p([Y_0, Y_1, \ldots, Y_j]|[X_0, X_1, \ldots, X_i]))$. It will be recursively evaluated as $$f_{(\overline{X},\overline{Y})}(i,j) = \min \begin{cases} f_{(\overline{X},\overline{Y})}(i-1, j) - \log((1-g(X_i))q_d(X_i)) \\ f_{(\overline{X},\overline{Y})}(i, j-1) - \log(g(X_{i-1})/|\Lambda|) \\ f_{(\overline{X},\overline{Y})}(i-1, j-1) - \log((1-g(X_{i-1}))q_s(X_i, Y_j)) \end{cases}.$$

In the preferred embodiment, if ground truth phoneme sequences are known, then channel parameters $Q=\{q_d, q_i, Q_s\}$ are estimated. The parameter $q_d$ represents phoneme deletion parameter, $q_i$ is for phoneme insertion which is modelled by geometric random variable and $Q_s$ represents phoneme substitution probabilities. The parameter estimation involves expectation maximization framework. The system 100 initially finds the sequence alignments for all given ground truth phoneme sequences $\overline{X}$s and their transcript sequences $\{\overline{Y}^1, \ldots, \overline{Y}^n\}$ by back tracing $f_{(\overline{X},\overline{Y})}$ matrix with initial insertion deletion and substitution costs being equal to 1. In expectation step, the system 100 estimates the channel parameters using these alignments. Further in maximization step the system 100 finds alignments using estimated channel parameters. The process repeats until convergence. The parameter are estimated as follows:

$$q_s(X_i, Y_j) = \frac{C_s(X_i, Y_j)}{\sum_{\forall Y_j} C_s(X_i, Y_j) + C_D(X_i)},$$

$$q_d(X_i) = \frac{C_D(X_i)}{\sum_{\forall Y_j} C_s(X_i, Y_j) + C_D(X_i)} \text{ and } q_i(X_i) = \frac{C_I(X_i)}{C_I(X_i) + C_B(X_i)}$$

where $C_s(X_i, Y_j)$ is the counts of number of times $X_i$ got substituted with $Y_j$, $C_D(X_i)$ shows the count of number of times $X_i$ got deleted, $C_I(X_i)$ is count of number of insertions after $X_i$ and $C_B(X_i)$ is count of number of insertion bursts after $X_i$. The parameters are estimated for all phonemes $X_i$.

In the preferred embodiment, if the ground-truth phoneme sequences are not known then the channel parameters Q are estimated in unsupervised way by using the dictionary V as ground truth phoneme sequences. Initially, the system 100 estimates the alignments with edit cost 1 and estimate the labels from dictionary using maximum likelihood rule as discussed above. In Expectation step, the system 100 uses the estimated labels as ground truths to estimate the channel parameters. In maximization step the system 100 re-estimate the labels from the dictionary and find the alignments of them with the transcription sequences $\{\overline{Y}^1, \ldots, \overline{Y}^n\}$. The process repeats until convergence.

In the preferred embodiment, the script specific IDS $Q_{script}$, worker specific IDS $Q_{worker}$ and global IDS $Q_g$ are estimated. $Q_{script}$ is estimated on the script specific transcriptions, $Q_{worker}$ is estimated on worker specific responses and $Q_g$ is estimated using all transcriptions. Finally, IDS model, Q used in decoding is found using linear combinations of above as: $Q=\lambda_1 Q_{script}+\lambda_2 Q_{workers}+\lambda_3 Q_g$. Here $\lambda_1+\lambda_2+\lambda_3=1$.

In the preferred embodiment, the system 100 further includes a reputation module 110. The reputation module 110 is configured to compute the worker reputation and filter out the spammer from the plurality of workers. The reputation of the worker is estimated by simulating worker's IDS channel Q on dictionary words multiple times and decoding the output for considering the average accuracy of it as a reputation score. The workers having low reputation score are filtered out for a given transcription job.

In the preferred embodiment, the task allocation module 112 which is configured to compute word beliefs and to allocate the transcription tasks to the plurality of the mismatched crowd workers. The word belief can be obtained by taking ratio of likelihood probability of mapped phoneme sequences of current multi-scripted transcriptions given the current estimate of the word to the sum of likelihood probabilities of mapped phoneme sequences of current multi-script transcriptions given the phoneme sequence of each dictionary word. Formally, the word belief is computed as:

$$b_n(i) = \frac{p(t_1^n, \ldots, t_{k(n)}^n | w_n)}{\sum_{j=1}^{D} p(t_1^n, \ldots, t_{k(n)}^n | d_j)} = \frac{\prod_{k=1}^{k(n)} p(t_k^n | w_n)}{\sum_{j=1}^{D} \prod_{k=1}^{k(n)} p(t_k^n | d_j)}.$$

In addition to this, the IDS channel of each available worker is simulated by feeding in the current estimates of available words and the resulted simulated transcription is then used to compute the word belief by updating the current set of transcriptions with the new simulated transcription and finally the belief for each available word with each worker is simulated and used in task allocation. The transcription tasks are assigned in such a way that average simulated word belief is maximized. The system can use bipartite matching algorithms to perform such task allocation. The average word belief can be obtained by simulating worker channel multiple times and if the word belief is sufficiently high the spoken word will be transcribed.

Figure 3:
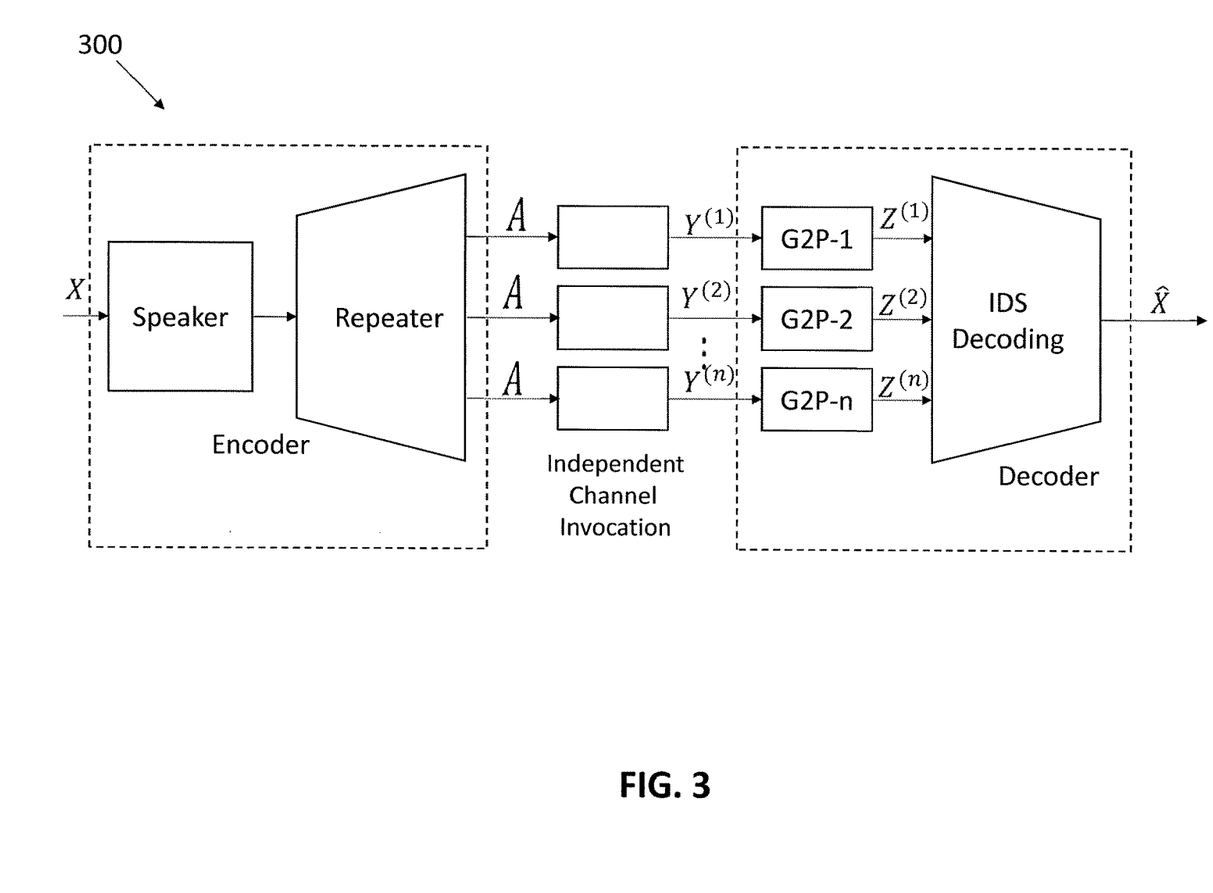
FIG. 3 is a schematic diagram of transcription decoding architecture from multi-scripted transcriptions into source script, according to some embodiments of the present disclosure.

Referring FIG. 3, a schematic diagram of the transcription decoding architecture, where the system 100 generates the transcription in the source script from the multi-script transcriptions of the multilingual mismatched crowd.

Figure 4:
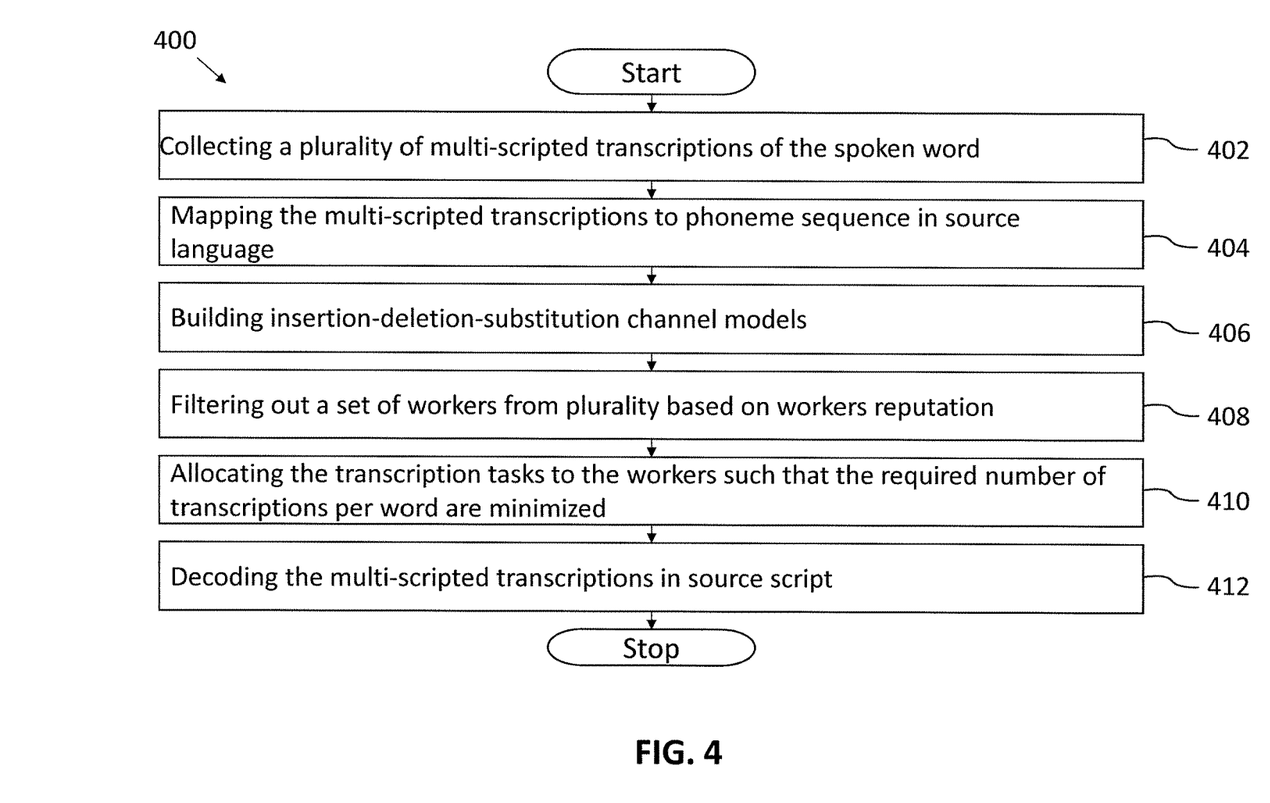
FIG. 4 illustrates a method for transcribing one or more spoken word utterances of a source language using a multilingual mismatched crowd, according to some embodiments of the present disclosure.

Referring FIG. 4, a method 400 for transcribing spoken word utterances of a source language using a multilingual mismatched crowd.

At step 402, where the process collects a plurality of multi-scripted noisy transcriptions of a spoken word obtained from a plurality of workers. The plurality of workers include people who are unfamiliar with the source language that is being spoken and also different to each other even for their script for the same word.

At step 404, where the transcription decoding module 108 maps each of the collected plurality of multi-scripted transcriptions to a phoneme sequence in the source language using script specific grapheme to phoneme model.

At step 406, where the transcription decoding module 108 builds IDS channel models from the multi-scripted transcriptions. To train the channel parameters, it uses expectation maximization algorithm.

At step 408, where the process filters out a set of workers of the plurality of workers based on the reputation of the workers evaluated by simulating IDS channel for worker specific on the dictionary words.

At step 410, where the process allocates the transcription tasks to the set of workers such that the required number of transcriptions per word are minimized.

At final step 412, where the process decodes the multi-scripted transcription in source script, wherein the decoding process finds likelihood probability of the mapped phonemes sequences of the multi-scripted mismatched crowd transcriptions with each of the predefined dictionary word's phoneme sequences and voting the dictionary word that maximize above probability. Further, the decoding process determines word belief by taking ratio of likelihood probability of mapped phoneme sequences of transcriptions given the current estimate of word to the sum of likelihood probabilities of mapped phoneme sequences of the transcriptions given the phoneme sequences of each dictionary word.

Figure 5:
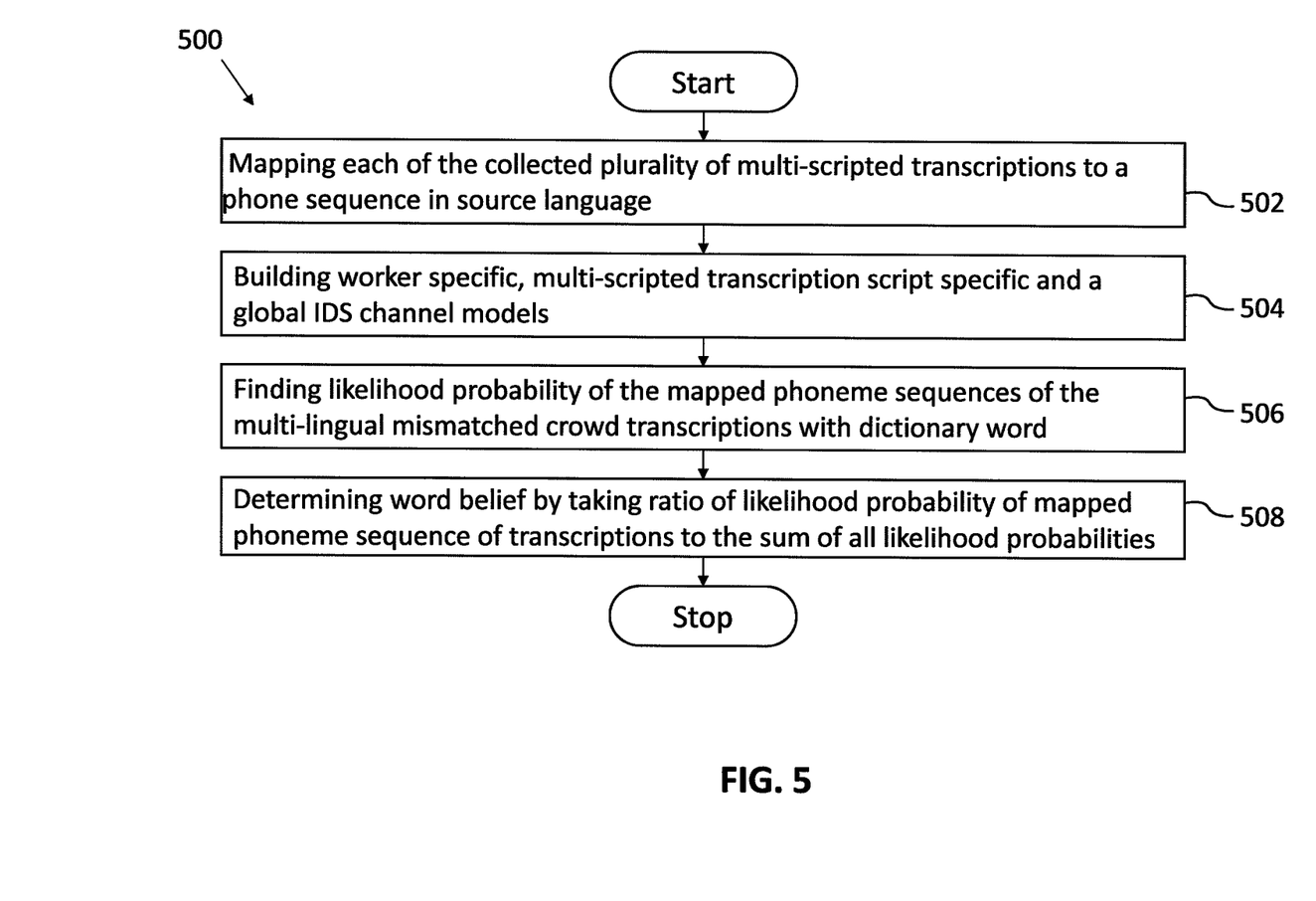
FIG. 5 illustrates a method for decoding the multi-scripted transcription and evaluating reputation of the workers involved in the transcriptions, according to some embodiments of the present disclosure.

Referring FIG. 5, where the transcription decoding of the plurality of multi-scripted transcriptions into the source script is carried out.

At step 502, the process of decoding includes mapping each of the collected plurality of multi-scripted transcriptions to a phoneme sequence in the source language using script specific graphemes to phoneme (G2P) model. During training of G2P models, the set of reference strings and its phonetic decompositions are applied as an input and mapping are learned using Expectation Maximization Algorithms. Once the G2P model is trained, it can be used to generate the phonetic sequence given the input string.

In the training process of IDS, if ground truth phoneme sequences of the multi-script transcriptions are known in source language then these transcriptions can be used directly to train IDS model using expectation maximization algorithm. And, if ground truth phoneme sequences are not known then transcriptions of words are mapped to phoneme sequences and then the phoneme sequences of the predefined dictionary words are used to train IDS channels in iterative fashion using expectation maximization algorithm.

At step 504, where the process builds IDS models for worker specific, transcription script specific and a global from the multi-scripted transcriptions. The final IDS parameters are obtained by considering the linear combination of all of them.

At step 506, where the process finds the likelihood probability of the mapped phoneme sequences of crowd transactions of a spoken word with each of the phoneme sequence of dictionary word. The likelihood probability is obtained by aligning both phoneme sequence using IDS channel parameters. Further, wherein the likelihood probabilities of each mapped phoneme sequences of multi-scripted transcriptions of a word with a given dictionary word's phoneme sequence are obtained and multiplied so as to obtain the likelihood probability. The dictionary word providing maximum likelihood probability is voted as the transcription of a spoken word. While aligning the phoneme sequences using IDS channel parameters, the parameters are weighted in linear combination of worker specific, transcription script specific and global IDS channel parameters.

In the final step at 508, the transcription decoding process determines word belief by taking ratio of likelihood probability of mapped phoneme sequences of transcriptions given the current estimate of word to the sum of likelihood probabilities of mapped phoneme sequences of the transcriptions given the phoneme sequence of each dictionary word.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

A system and method to transcribe one or more spoken word utterances of a source language using a multilingual mismatched crowd. The process comprises collection of a plurality of multi-scripted noisy transcriptions of the spoken word obtained from plurality of workers of the multilingual mismatched crowd. The collected words are mapped to a phoneme sequence in the source language using script specific graphemes to phoneme model. Further, it builds a multi-scripted transcription script specific, worker specific and a global insertion-deletion-substitution (IDS) channel. In addition to the transcription process, the disclosure also determines reputation of workers to allocate the transcription task. Determination of reputation is based on the word belief. The word belief is determined by taking ratio of likelihood probability of mapped phoneme sequence of transcriptions given the current estimate of word to the sum of likelihood probabilities of mapped phoneme sequences of the transcriptions given the phoneme sequence of each dictionary word.

The embodiments of present disclosure herein addresses unresolved problem of transcription of a source language from multilingual mismatched crowd to the source language. In addition to, the transcription task allocation to workers based on their performance in terms of likelihood probability analysis.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer implemented method for transcribing one or more spoken word utterances of a source language using a multilingual mismatched crowd unfamiliar with the source language, the method comprises:
   collecting, at a word transcription table, a plurality of multi-scripted noisy transcriptions of the spoken word obtained from a plurality of workers of the multilingual mismatched crowd, wherein the word transcription table is configured to store transcription responses of the spoken word segments presented to the plurality of workers, audio chunk id, each of the plurality of workers id, and the plurality of workers transcription text;
   mapping each of the collected plurality of multi-scripted transcriptions to a phoneme sequence in the source language using script specific graphemes to phoneme model;
   building worker specific insertion-deletion-substitution (IDS) channel model, multi-scripted transcription script specific IDS channel model and a global IDS channel model from the multi-scripted transcriptions;
   filtering out a set of workers of the plurality of workers based on the reputation of the workers, estimated by simulating IDS channel for worker specific on dictionary words using worker reputation module;
   allocating the transcription tasks to the set of workers such that required number of transcriptions per word are minimized; and
   decoding, at a transcription decoding module, the plurality of multi-scripted transcriptions are combined to decode the transcription in source script, wherein the decoding comprises steps of:
   finding likelihood probability of the mapped phoneme sequences of the multi-scripted mismatched crowd transcriptions with each of the dictionary words phoneme sequence using insertion-deletion-substitution channel parameters and voting the dictionary word that maximizes above likelihood; and
   determining word belief by taking ratio of the likelihood probability of the mapped phoneme sequences of transcriptions given current estimate of word to sum of the likelihood probabilities of mapped phoneme sequences of the transcriptions given the phoneme sequence of each dictionary word.

2. The method of claim 1, wherein the multi-scripted transcriptions of words, whose ground truth phoneme sequences are known in the source language, are used to train worker script's grapheme to source language's phoneme mapping models using expectation maximization algorithm.

3. The method of claim 2, further wherein with the help of ground truth phoneme sequences, the worker specific, the transcription script specific and the global IDS channel models are trained using the expectation maximization algorithm.

4. The method of claim 1, wherein the building of the worker specific IDS channel model using gold standard transcription text.

5. The method of claim 1, wherein the multilingual mismatched crowd includes the plurality of workers who are having different scripts for the same word, unfamiliar to the source language and transcribing the given words of the source language in their own language.

6. The method of claim 1, wherein the multi-script transcriptions of words whose ground truths are not known are first mapped to the phoneme sequence using the graphemes to phoneme (G2P) model, and with the help of phoneme sequences of the dictionary words the worker specific, the transcription script specific and the global IDS channel models are trained in iterative fashion using expectation maximization algorithm.

7. The method of claim 1, wherein estimation of worker reputation is based on transcribed words whose ground truth is known and task allocation follows the estimated worker reputation.

8. The method of claim 1, wherein the task allocation utilizes bipartite matching algorithm to allocate the tasks to worker such that average word belief is maximized.

9. The method of claim 1, wherein the likelihood probability of a mapped phoneme sequence of the plurality of worker's transcription of the spoken word given the phoneme sequence of the dictionary word is obtained by aligning both phoneme sequences using linearly combined IDS channel parameters of worker, his/her script and global.

10. The method of claim 1, wherein the likelihood probabilities of each mapped phoneme sequences of the multi-scripted transcriptions of a word with the dictionary words phoneme sequences are obtained and multiplied so as to obtain the likelihood probability, and wherein, the dictionary word that provides maximum likelihood probability is considered as decoded word.

11. A system for transcribing one or more spoken word utterances of a source language using a multilingual mismatched crowd unfamiliar with the source language, the system comprising:
   a processor;
   a memory communicatively coupled to the processor and the memory contains instructions that are readable by the processor;
   a database parted within the memory, wherein the database comprises an audio chunk table and a word transcription table, wherein the audio chunk table is configured to store one or more information of a plurality of workers, one or more spoken word segments of each of the plurality of workers, number of responses given by the each of the plurality of workers and transcription score of the each of the plurality of workers, and further wherein, the word transcription table is configured to store transcription responses of the spoken word segments presented to the plurality of workers, audio chunk id, each of the plurality of workers id, and the plurality of workers transcription text;
   a plurality of typing interfaces are configured according to script preference of the each of the plurality of workers of the multilingual mismatched crowd;

a reputation module is configured to compute the worker reputation and filter out spammer from the plurality of workers;

a task allocation module is configured to compute word beliefs and to allocate the transcription tasks to the plurality of workers, wherein the reputation of the plurality of workers is estimated by simulating the worker specific insertion-deletion-substitution (IDS) channel on dictionary words; and a transcription decoding module is configured to generate transcription in the source language from multi-scripted transcriptions of the plurality of workers.

12. The system of claim 11, wherein the transcription decoding module is configured to invoke a grapheme to phoneme model for mapping the multi-scripted transcriptions with a phoneme sequence of the source language.

13. The system of claim 11, wherein the transcription decoding module is configured to compute likelihood by aligning phoneme sequence of dictionary word with the phoneme sequence of the multi-scripted transcriptions of the plurality of workers.

14. The system of claim 11, wherein the transcription decoding module is configured to invoke insertion-deletion-substitution channel model for decoding the word transcription in the source language from the multi-scripted transcriptions.

15. The system of claim 11, wherein the task allocation module is to decide the word that needs more transcriptions from its belief probability.

\* \* \* \* \*